US008401763B2

(12) United States Patent
Kato et al.

(10) Patent No.: US 8,401,763 B2
(45) Date of Patent: Mar. 19, 2013

(54) CONTROL DEVICE FOR INTERNAL COMBUSTION ENGINE

(75) Inventors: Naoto Kato, Susono (JP); Shinichi Soejima, Gotenba (JP); Kiyonori Takahashi, Susono (JP); Kaoru Ohtsuka, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 13/143,213

(22) PCT Filed: Apr. 1, 2009

(86) PCT No.: PCT/JP2009/056796

§ 371 (c)(1),
(2), (4) Date: Jul. 5, 2011

(87) PCT Pub. No.: WO2010/113297

PCT Pub. Date: Oct. 7, 2010

(65) Prior Publication Data

US 2012/0010801 A1 Jan. 12, 2012

(51) Int. Cl.
*B60T 7/12* (2006.01)

(52) U.S. Cl. .................... 701/103; 123/321; 123/406.23

(58) Field of Classification Search .......... 701/103–105, 701/114, 115; 123/319, 321, 345–348, 90.15, 123/406.23

See application file for complete search history.

(56) References Cited

U.S. PATENT DOCUMENTS

| | | | | |
|---|---|---|---|---|
| 6,109,236 | A | 8/2000 | Takahashi et al. | |
| 6,266,605 | B1 * | 7/2001 | Yasui et al. | 701/109 |
| 6,279,531 | B1 * | 8/2001 | Robichaux et al. | 123/339.19 |
| 6,684,150 | B2 * | 1/2004 | Yasui et al. | 701/106 |
| 7,484,504 | B2 * | 2/2009 | Kato et al. | 123/672 |
| 2002/0143460 | A1 * | 10/2002 | Yasui et al. | 701/106 |
| 2011/0160947 | A1 * | 6/2011 | Ideshio et al. | 701/22 |

FOREIGN PATENT DOCUMENTS

| | | |
|---|---|---|
| JP | A-10-325348 | 12/1998 |
| JP | A-10-325349 | 12/1998 |
| JP | A-2000-352340 | 12/2000 |
| JP | A-2002-327643 | 11/2002 |
| JP | A-2006-29194 | 2/2006 |
| JP | A-2006-200466 | 8/2006 |

OTHER PUBLICATIONS

International Search Report for International Patent Application No. PCT/JP2009/056796, mailed on Aug. 4, 2009 (w/ English translation).

* cited by examiner

*Primary Examiner* — John Kwon
(74) *Attorney, Agent, or Firm* — Oliff & Berridge, PLC

(57) ABSTRACT

In a control device which uses a specific physical quantity as a control variable of an internal combustion engine, and controls the internal combustion engine by manipulation of one or a plurality of actuators, switching of setting of a manipulation variable based on a required value of a physical quantity and setting of the manipulation variables by direct instruction to individual actuators is performed without generating discontinuity in a realized value of the physical quantity. When a manipulation variable instruction value directly designating a manipulation variable of an actuator is present, the manipulation variable instruction value is converted into a value of a physical quantity which is realized in the internal combustion engine by the operation quantity instruction value. When a deviation between a physical quantity conversion value converted from the manipulation variable instruction value and the physical quantity required value is within a predetermined range, switch of information for use in setting of the manipulation variable of each of the actuators is permitted.

12 Claims, 4 Drawing Sheets

CONTROL DEVICE FOR INTERNAL COMBUSTION ENGINE

TECHNICAL FIELD

The present invention relates to a control device for an internal combustion engine, and more particularly to a control device for an internal combustion engine which uses a specific physical quantity such as torque, an efficiency or an air-fuel ratio as a control variable of the internal combustion engine, and controls the internal combustion engine by manipulation of one or a plurality of actuators.

BACKGROUND ART

Control of an internal combustion engine is achieved by manipulation of one or a plurality of actuators. For example, in the case of control of a spark ignition type internal combustion engine, actuators such as a throttle, an ignition device and a fuel supply device are manipulated. The manipulation variables of the plurality of actuators may be individually determined for each of the actuators. However, with use of the torque demand control as disclosed in Japanese Patent Laid-Open No. 10-325348, control precision of torque can be enhanced by cooperative control of a plurality of actuators.

Torque demand control is a kind of feed forward control which uses torque as the control variable of an internal combustion engine, and determines the manipulation variable of each of the actuators so as to realize a required value thereof. In order to execute torque demand control, a model for deriving the manipulation variable of each of the actuators from a torque required value, in more detail, an inverse model of the internal combustion engine is needed. An engine inverse model can be configured by a map, a function or the combination of them. Japanese Patent Laid-Open No. 10-325348 discloses the art of enabling torque demand control by using a common model (expressed as control target amount calculation means in the above described publication) at an idle time and a non-idle time of an internal combustion engine.

Incidentally, the relationship between the manipulation variable of each of the actuators in an internal combustion engine and torque which is a control variable changes in accordance with the operating state and the operation conditions of the internal combustion engine. Accordingly, in order to calculate the manipulation variable of each of the actuators for realizing a torque required value accurately, an operating state and operation conditions are required as information. However, depending on the situation in which an internal combustion engine is placed, the necessary information cannot be sometimes obtained. For example, the air quantity which is taken into a cylinder can be calculated by using a throttle opening and the output value of an air flow sensor, but at the time of start, air already exists in an intake pipe, and therefore, calculation of an accurate intake air quantity is difficult. When the reliability of the engine information for use in torque demand control is low, each of the actuators cannot be properly manipulated, and control precision of torque cannot be ensured.

As one idea for coping with such a situation, directly instructing individual actuators about the manipulation variables is conceivable in place of determining the manipulation valuable of each of the actuators from a torque required value. If instruction of the manipulated variables of the actuators can be directly given, even if the reliability of the engine information is low, at least unintended manipulation of the actuators is prevented from being performed.

Further, it is also effective to enable direct instruction of the manipulation variables of the actuators in the case of performing special control which is not assumed in the engine inverse model. For example, an internal combustion engine exists, which enables operation by homogeneous combustion at a time of a middle and high load and operation by stratified combustion at a time of a low load. However, the relationship of the manipulated variable of each of the actuators and torque which is a control variable totally differs between homogenous combustion and stratified combustion. Therefore, when the aforementioned engine inverse model is designed with homogenous combustion as a precondition, the manipulation variables of the actuators cannot be calculated by using the engine inverse model at the time of stratified combustion. In such a case, if direct instruction of the manipulation variables of the actuators is possible, each of the actuators can be operated with the manipulation variable corresponding to the stratified combustion.

As described above, as the setting method of the manipulation variables of the actuators, there are the method which sets the manipulation variable with the required value of the physical quantity such as torque used as information, as the conventional torque demand control, and the method which sets the manipulation variables by direct instruction to the individual actuators. The former method has the advantage of being capable of operating respective actuators while allowing them to corporate with each other for realization of the requirement concerning the physical quantity. The latter method has the advantage of being capable of causing each actuator to execute the necessary operation in control of an internal combustion engine properly without receiving the influence of the operating state and the operation conditions of the internal combustion engine. Like this, both the methods have their own advantages, but have disadvantages. However, the advantage of one is in the complementary relationship with the disadvantage of the other, and therefore, in making both of them properly switchable, a large merit can be expected in control of an internal combustion engine.

However, one problem exists here. This is, in what timing switching is performed. Since the physical quantity such as torque depends on the manipulation variables of actuators, if switch timing is not proper, discontinuity is likely to occur to any of the physical quantities. For example, in the case of occurrence of discontinuity in torque, reduction in drivability due to torque shock is brought about.

SUMMARY OF INVENTION

The present invention has an object to perform switch of setting of manipulation variables based on a required value of a physical quantity and setting of manipulation variables by giving a direct instruction to individual actuators without generating discontinuity in a realized value of the physical quantity in a control device which uses a specific physical quantity as a control variable of an internal combustion engine, and controls the internal combustion engine by manipulation of one or a plurality of actuators.

A control device according to the present invention includes means which sets a value of a physical quantity required to be realized in an internal combustion engine. Hereinafter, the value of a required physical quantity will be called a physical quantity required value. A physical quantity described here means a specific physical quantity which is used as a control variable of an internal combustion engine. Further, the control device according to the present invention includes means which designates a manipulation variable of at least one actuator of one or a plurality of actuators for controlling the internal combustion engine. Hereinafter, the value of the designated manipulation variable will be called a manipulation variable instruction value. The actuator instructed of the manipulation variable can be fixed, or can be changed in accordance with the control content desired to be realized. However, direct instruction of the manipulation variables to such individual actuators is preferably performed only when necessary, that is, when a special reason in control is present.

Further, the control device according to the present invention includes means which sets a manipulation variable of each actuator which controls the internal combustion engine based on information of any one of a physical quantity required value and a manipulation variable instruction value. Hereinafter, the set manipulation variable will be called the manipulation variable set value. The control device according to the present invention manipulates each actuator in accordance with the manipulation variable set value. At the time of setting the manipulation variable, which information of the physical quantity required value and the manipulation variable instruction value is to be used depends on the requirement in the control of the internal combustion engine. For example, if realization of the requirement relating to the physical quantity is prioritized, the physical quantity required value is used, whereas if making the actuator execute a specific operation is prioritized, the manipulation variable instruction value is used. Further, when the calculation precision of the manipulation variable based on the physical quantity required value is low, the manipulation variable instruction value may be used.

In any case, switch of information for use in setting the manipulation variable is needed, and the control device according to the present invention includes means for providing timing of the switch. One of them is means which converts the manipulation variable instruction value into a value of the physical quantity which is realized in the internal combustion engine by the manipulation variable instruction value. Hereinafter, the value of the physical quantity which is converted from the manipulation variable instruction value will be called a physical quantity conversion value. The other one is means which permits switch of the information for use in setting of the manipulation variable when a deviation between the physical quantity required value and a physical quantity conversion value is within a predetermined range. By including the means, the information for use in setting of the manipulation variable is switched to the manipulation variable instruction value from the physical quantity required value, or to the physical quantity required value from the manipulation variable instruction value under the condition that the deviation between the physical quantity required value and the physical quantity conversion value converted from the manipulation variable instruction value is within the predetermined range.

According to the control device according to the present invention, the manipulation variable instruction value and the physical quantity required value are compared at the level of the physical quantity, and switching is executed, whereby the phenomenon which appears in the internal combustion engine which is a control target can be properly controlled. As a more specific effect, switching can be achieved without generating discontinuity in the realized value of the physical quantity. Accordingly, for example, if the physical quantity is torque, a torque level difference accompanying switching can be eliminated. The predetermined range of the deviation which is the determination reference of switch is preferably narrow from the viewpoint of continuity of the physical quantity. If switch is permitted when the physical quantity required value and the physical quantity conversion value correspond to each other, smooth switching can be realized.

The control device according to the present invention has two preferable modes as described as follows.

According to the first preferable mode of the control device according to the present invention, setting of the manipulation variable is performed as follows. The physical quantity value of any one of the physical quantity required value and the physical quantity conversion value is selected, and the physical quantity value which is selected (hereinafter, called the physical quantity selection value) is converted into a manipulation variable of each actuator for realizing the physical quantity selection value in the internal combustion engine. Hereinafter, the value of the manipulation variable converted from the physical quantity selection value will be called a manipulation variable conversion value. The manipulation variable conversion value is set as a final manipulation variable. Switch of the information for use in setting of the manipulation variable is achieved by switching of the physical quantity value to be selected to the physical quantity conversion value from the physical quantity required value, or to the physical quantity required value from the physical quantity conversion value. Switch of selection of the physical quantity value is permitted when the deviation between the physical quantity required value and the physical quantity conversion value is within a predetermined range. According to the first mode, the physical quantity conversion value for use in determination of switch also can be used as the information for setting the manipulation variable.

In the aforementioned first mode, when switch of the information for use in setting of the manipulation variable is performed, it may be made the condition for permitting the switch that the deviation between the physical quantity required value and the physical quantity conversion value is within a predetermined range and the deviation between the manipulation variable conversion value and the manipulation variable instruction value is within a predetermined range.

In the aforementioned first mode, a common conversion map can be used in any of conversion into the manipulation variable from the physical quantity selection value and conversion into the physical quantity from the manipulation variable instruction value. The common conversion map is the map in which a parameter value which is correlated with the physical quantity, and a parameter value which is correlated with a manipulation variable of at least one actuator of the actuators for use in control of the internal combustion engine are associated with each other. By common use of such a conversion map, a conversion error at the time of converting the manipulation variable into the physical quantity and converting the physical quantity into the manipulation variable again can be reduced. Thereby, when the manipulation variable instruction value is selected as the information for use in setting of the manipulation variable, an error between the manipulation variable set value and the manipulation variable instruction value can be reduced.

In the aforementioned first mode, for conversion into the manipulation variable from the physical quantity selection value, an engine model which is a result of modeling a control characteristic of the internal combustion engine by manipulation of each actuator is preferably used, and for conversion into the physical quantity from the manipulation variable instruction value, an inverse model of the engine model is preferably used. In such a case, when the manipulation variable instruction value is selected as the information for use in setting of the manipulation variable, what is obtained by converting the manipulation variable instruction value with the inverse model of the engine model, and further converting the conversion result with a regular model is the manipulation variable set value, and therefore, the manipulation variable set value can be matched with the manipulation variable instruction value.

According to the second preferable mode of the control device according to the present invention, setting of the manipulation variable is performed as follows. The physical quantity required value is converted into a manipulation variable of each actuator for realizing the physical quantity required value in the internal combustion engine. Subsequently, any one of a manipulation variable (hereinafter, called a manipulation variable conversion value) converted from the physical quantity required value and the manipulation variable instruction value is selected for each actuator. Hereinafter, the value of the selected manipulation variable will be called a manipulation variable selection value. The manipulation variable selection value is set as a manipulation variable. Switch of the information for use in setting of the manipulation variable is achieved by switching the manipulation variable value to be selected to the manipulation variable instruction value from the manipulation variable conversion value, or to the manipulation variable conversion value from the manipulation variable instruction value. Switch of selection of the manipulation variable value is permitted when the deviation between the physical quantity required value and the physical quantity conversion value is within a predetermined range. According to the second mode, when the manipulation variable instruction value is selected as the information for use in setting of the manipulation variable, the manipulation variable instruction value can be directly set as the manipulation variable.

In the aforementioned second mode, when switch of the infatuation for use in setting of the manipulation variable is performed, it may be made the condition for permitting the switch that the deviation between the physical quantity required value and the physical quantity conversion value is within a predetermined range and the deviation between the manipulation variable conversion value and the manipulation variable instruction value is within a predetermined range.

In the aforementioned second mode, a common conversion map can be used in any of conversion into a manipulation variable from a physical quantity required value and conversion into a physical quantity from a manipulation variable instruction value. The common conversion map is a map in which a parameter value which is correlated with the physical quantity, and a parameter value which is correlated with a manipulation variable of at least one actuator of the actuators for use in control of the internal combustion engine are associated with each other. By common use of such a conversion map, the data quantity which should be stored in the memory can be reduced.

In the aforementioned second mode, for conversion into the manipulation variable from the physical quantity selection value, an engine model which is a result of modeling a control characteristic of the internal combustion engine by manipulation of each actuator may be used, and for conversion into the physical quantity from the manipulation variable instruction value, an inverse model of the engine model may be used.

Furthermore, in the control device according to the present invention, a plurality of kinds of physical quantities may be used as the control variables of the internal combustion engine. For example, two kinds of physical quantities that are torque and efficiency, three kinds of physical quantities that are torque, efficiency and an air-fuel ratio, or the like. When the physical quantity required value is set with respect to a plurality of different physical quantities, the following method can be adopted as the switch determination method.

One of the methods which can be adopted is to permit switch of the information for use in setting of the manipulation variable when the deviation between the physical quantity required value and the physical quantity conversion value with respect to the physical quantity in which continuity is considered to be the most important is within a predetermined range. In this case, conversion of the manipulation variable instruction value into the physical quantity may be performed with respect to at least the value of the physical quantity in which continuity is considered to be the most important out of a plurality of physical quantities. According to the method, switch can be achieved without generating discontinuity in the realized value of the physical quantity in which continuity is considered to be the most important. Further, the time required for switch can be prevented from being long.

Another method that can be adopted is to permit switch of the information for use in setting of the manipulation variable when the deviations between physical quantity required values and physical quantity conversion values are within a predetermined range with respect to all the plurality of physical values. In this case, conversion of the manipulation variable instruction value into the physical quantity is performed with respect to the respective values of a plurality of physical quantities. According to the method, switch can be achieved without generating discontinuity in the realized values of all the physical quantities which are required.

DESCRIPTION OF EMBODIMENTS

Embodiment 1

Embodiment 1 of the present invention will be described with reference to FIGS. 1 to 3.

Figure 1:
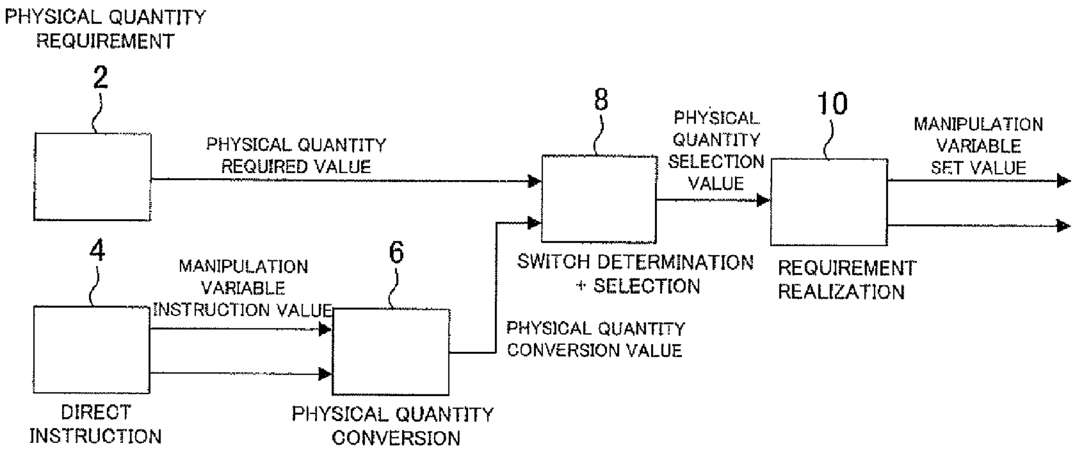
FIG. 1 is a functional block diagram of a control device for an internal combustion engine of embodiment 1 of the present invention.

FIG. 1 is a functional block diagram of a control device for an internal combustion engine of embodiment 1 of the present invention. In FIG. 1, the functions which the control device of the present embodiment has are shown in blocks, and the flows of information among blocks are shown by the arrows. The control device of the present embodiment can be expressed by five blocks when broadly divided in accordance with the functions. At the most upstream position of the flow of the information, two blocks are disposed in parallel. One block 2 is a required value setting section, and the other block 4 is a manipulation variable instruction section. A block 6 which is located downstream of the manipulation variable instruction section 4 is a physical quantity converting section. A block 8 which is located downstream of and is common to the required value setting section 2 and the physical quantity converting section 6 is a physical quantity value selecting section. A block 10 which is located downstream of the physical quantity value selecting section 8 is a realizing section.

First, the function of each of the blocks will be described along the flow of the information with the required value setting section 2 as a starting point. In the required value setting section 2, the required value of the specific physical quantity which is used as the control variable of the internal combustion engine is set. The specific physical quantity is a physical quantity which appears particularly as the output of the internal combustion engine such as torque, heat or exhaust emission, among the physical quantities related to control of the internal combustion engine. Torque is a typical example of such physical quantities. Further, an efficiency and an air-fuel ratio are also the physical quantities which are preferably used as the control variables. As a matter of course, the physical quantities other than these physical quantities are allowed to be used as the control variables. However, they are preferably the physical quantities which can express the requests concerning the functions of the internal combustion engine such as drivability, exhaust gas, fuel efficiency, noise, and vibration by numeral values. Hereinafter, the required value of the physical quantity which is set in the required value setting section 2 will be called a physical quantity required value.

The physical quantity required value which is set in the required value setting section 2 is inputted in the physical quantity value selecting section 8. A physical quantity conversion value is also inputted in the physical quantity value selecting section 8 from the physical quantity converting section 6 which will be described later. The physical quantity value selecting section 8 selects any one of the two physical quantity values which are inputted, that is, the physical quantity required value and the physical quantity conversion value. Hereinafter, the physical quantity value which is selected in the physical quantity value selecting section 8 will be called a physical quantity selection value. Which of the two physical quantity values is selected is determined from the request in control of the internal combustion engine. The physical quantity value selecting section 8 switches selection in accordance with the request in control. What is important at this occasion is the timing for switching. The switch determination function for determining switch timing is attached to the physical quantity value selecting section 8. The switch determination function which the physical quantity value selecting section 8 has will be described in detail later.

The physical quantity selection value selected in the physical quantity value selecting section 8 is inputted in the realizing section 10. The realizing section 10 has the conversion function of converting the inputted physical quantity selection value into the manipulation variable of each of the actuators. For conversion of the physical quantity selection value into the manipulation variable, the inverse model of the engine model, which is obtained by modeling the control characteristic of the internal combustion engine by manipulation of each of the actuators, is used. The inverse model of the engine model is configured by one or a plurality of conversion maps and one or a plurality of conversion formulae. The physical quantity selection value is sequentially converted into other parameters by the conversion maps and conversion formulae, and is finally converted into the manipulation variable of each of the actuators. The manipulation variable conversion value which is converted from the physical quantity selection value is the value of the manipulation variable of each of the actuators which is necessary for realizing the physical quantity selection value in the internal combustion engine. The manipulation variable conversion value is set as the value which is finally set as the manipulation variable, that is, the manipulation variable set value, and each of the actuators is manipulated in accordance with the manipulation variable set value.

When the physical quantity required value is selected in the physical quantity value selecting section 8, the manipulation variable of each of the actuators is set based on the physical quantity required value in the realizing section 10. Each of the actuators is manipulated in accordance with the manipulation variable, and thereby, the physical quantity required value can be realized in the actual control variable of the internal combustion engine.

Next, the function of each of the blocks will be described along the flow of the information with the manipulation variable instruction section 4 as the starting point. In the manipulation variable instruction section 4, the value of the manipulation variable which should be directly designated to the actuator is set. The target actuator here is an actuator for controlling the internal combustion engine and an actuator with its manipulation variable being in the correlation with the aforementioned specific physical quantity. For example, in the case of a spark ignition type internal combustion engine, a throttle, an ignition device, a fuel injection device and the like correspond to such actuators. The manipulation variable instruction section 4 designates the manipulation variable of at least one actuator among a plurality of actuators which can be the target of direct instruction in a numeral value. The manipulation variable instruction section 4 directly instructs the individual actuators about the manipulation variables only when it is necessary, that is, when the intended manipulation cannot be performed with manipulation of the actuators based on the aforementioned physical quantity required value. Hereinafter, the value of the manipulation variable designated by the manipulation variable instruction section 4 will be called a manipulation variable instruction value.

The manipulation variable instruction value designated by the manipulation variable instruction section 4 is inputted in the physical quantity converting section 6. The physical quantity converting section 6 has a conversion function of converting the inputted manipulation variable designation value into a physical quantity. The converted physical quantity is a specific physical quantity with the required value set in the aforementioned required value setting section 2. For conversion of the manipulation variable instruction value into a physical quantity, an engine model (regular model) which is obtained by modeling the control characteristic of the internal combustion engine by manipulation of each of the actuators is used. The engine model is configured by one or a plurality of conversion maps and one or a plurality of conversion formulae. The conversion map used here is a conversion map common to the one used in the inverse model of the realizing section 10. In the conversion map, the parameter value correlated with the physical quantity, and the parameter value correlated with the manipulation variable of any of the actuators are associated with each other with information relating to the operating state of the internal combustion engine as a key. The manipulation variable instruction value is sequentially converted into other parameters by the conversion map and conversion formula, and is finally converted into the value of the physical quantity. The value of the physical quantity converted from the manipulation variable instruction value is the value of the physical quantity which is realized in the internal combustion engine by the manipulation variable instruction value. Hereinafter, the value of the physical quantity which is converted from the manipulation variable designation value will be called a physical quantity conversion value.

The physical quantity conversion value converted in the physical quantity converting section 6 is inputted in the aforementioned physical quantity value selecting section 8. If the physical quantity conversion value is selected in the physical quantity value selecting section 8, the manipulation variable of each of the actuators is set based on the physical quantity conversion value in the aforementioned realizing section 10. In the realizing section 10, the inverse model of the engine model which is used in the physical quantity converting section 6 is used, and therefore, conversion which is performed in the realizing section 10 is inverse conversion of the conversion which is performed in the physical quantity converting section 6. Accordingly, the manipulation variable instruction value which is inputted in the physical quantity converting section 6, and the manipulation variable set value which is outputted from the realizing section 10 become substantially equal values. As is understood from this, according to the control device of the present embodiment, selection in the physical quantity value selecting section 8 is switched, and thereby, manipulation of each of the actuators in accordance with the manipulation variable which is directly designated in the manipulation variable instruction section 4 can be achieved.

Next, the switch determination function which the physical quantity value selecting section 8 has will be described in detail. As described above, in the physical quantity value selecting section 8, the physical quantity value which is selected is switched to the physical quantity conversion value from a physical quantity required value, or to the physical quantity required value from the physical quantity conversion value. Switch may be performed with a signal from outside used as a trigger, or may be performed by performing determination inside the physical quantity value selecting section 8. For example, when the manipulation variable instruction value is set in the manipulation variable instruction section 4, and the physical quantity conversion value which is the conversion value of it is inputted in the physical quantity value selecting section 8, it may be determined that switch of selection to the physical quantity conversion value from the physical quantity required value is performed. What is important in this case is timing of switch as described above. Since the physical quantity which is used as the control variable of the internal combustion engine depends on the manipulation variable of the actuator, if the timing of switch is improper, a level difference occurs to the manipulation variable of the actuator, and due to this, a discontinuity is likely to occur to the physical quantity.

Thus, in the present embodiment, the timing of switch is determined by the following method. FIG. 2 is a view for explaining the determination method of switch timing according to the present embodiment. In the upper stage of FIG. 2, a change with time of each value relating to the manipulation variable of the first actuator is shown. Further, in the middle stage, a change with time of each value relating to the manipulation variable of the second actuator. On both the stages, the broken lines represent the manipulation variable instruction values, and the thin solid lines represent the manipulation variable conversion values converted from the physical quantity required values, and the thick solid lines represent the manipulation variable set values. On the lower stage of FIG. 2, a change with time of each value relating to the physical quantity is shown. The broken line represents the physical quantity conversion value, and the solid line represents the physical quantity required value.

In the present embodiment, under the condition that the deviation between the physical quantity required value and the physical quantity conversion value is within a predetermined range, switching is executed. Setting of the predetermined range is arbitrary, but if the range is too wide, a level difference easily occurs at the time of switching. Accordingly, from the viewpoint of preventing occurrence of a level difference in the physical quantity, the predetermined range is preferably as narrow as possible. In the case shown in FIG. 2, at the timing when the physical quantity required value and the physical quantity conversion value correspond to each other (time point t1), switch of selection is performed to the physical quantity required value from the physical quantity conversion value.

Figure 2:
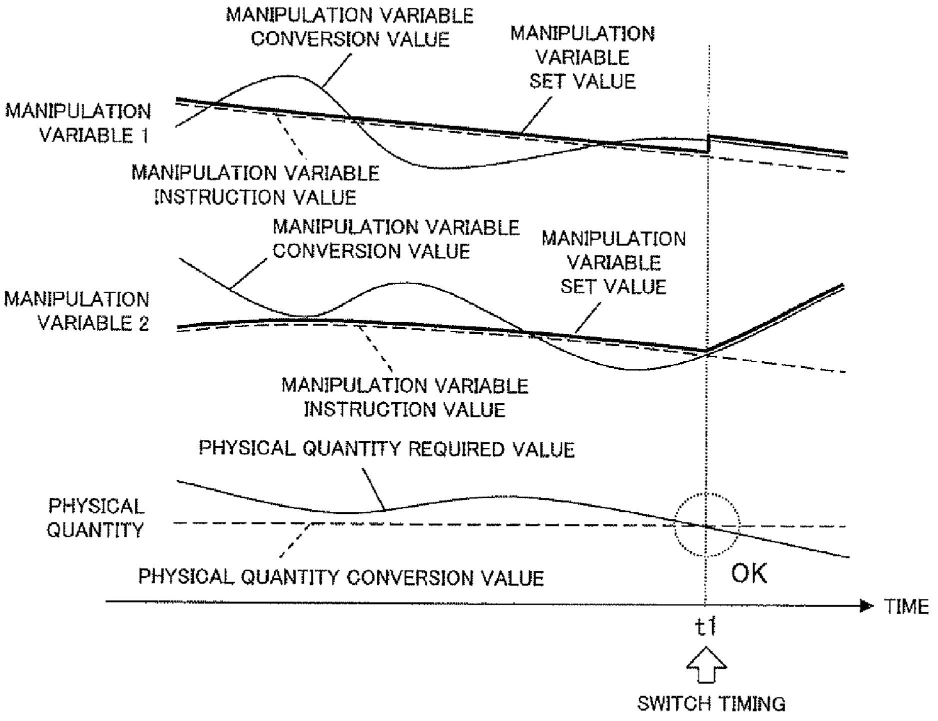
FIG. 2 is a view for explaining the determination method of switch timing according to embodiment 1 of the present invention.
Figure 3:
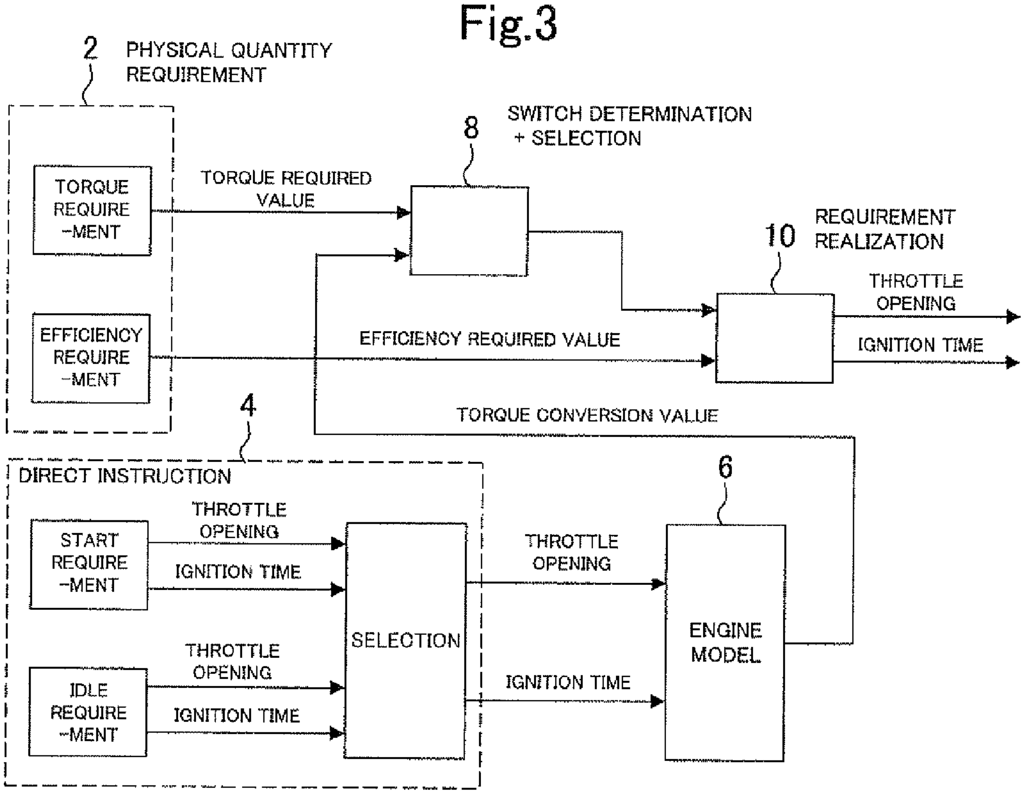
FIG. 3 is a functional block diagram of a specific example of embodiment 1 of the present invention.

As shown in FIG. 2, when the internal combustion engine is controlled by a plurality of actuators, there is a minimal chance that the manipulation variable instruction values and the manipulation variable conversion values correspond to each another at the same time in all the actuators. Therefore, if correspondence of the manipulation variable instruction values and the manipulation variable conversion values is adopted as the condition for switching, switching is unlikely to be performed forever. Further, even if the values correspond to each another at the level of the manipulation variable, the values are unlikely to correspond to each other at the level of the physical quantity. This is because in a certain kind of actuator, a delay exists in the response of the internal combustion engine to the manipulation thereof. In regard with this, according to the control device of the present embodiment, the manipulation variable instruction value is converted into a physical quantity, and switching is executed by comparing the values at the level of the physical quantity required value and the physical quantity, whereby the phenomenon which appears in the internal combustion engine which is a control target can be properly controlled. More specifically, it becomes possible to achieve switch to the manipulation by the manipulation variable instruction value from the manipulation of each actuator by the physical quantity required value, or to the manipulation by the physical quantity required value from the manipulation by the manipulation variable instruction value.

Finally, a specific example of the present embodiment will be shown. FIG. 3 shows the specific example of the present embodiment in a functional block diagram. In this example, two kinds of physical quantities that are torque and an efficiency are used as the control variables of the internal combustion engine. The efficiency described here means the ratio of the torque which is actually outputted to the potential torque which can be outputted by the internal combustion engine. In the required value setting section 2 of this example, the torque required value and the efficiency required value are set. However, what is inputted in the physical quantity value selecting section 8 is only the torque required value, and the efficiency required value is directly inputted in the realizing section 10.

Further, in the manipulation variable instruction section 4 of this example, two kinds of manipulation variables that are the throttle opening and the ignition'time are directly designated. As the content of direct instruction, two instructions that are a direct instruction corresponding to start demand, and a direct instruction corresponding to warming up requirement can be selected. The respective instruction values of the throttle opening and the ignition time which are selected are inputted in the physical quantity converting section 6, and are converted into torque in accordance with the engine model. In more detail, the engine model which is used in the physical quantity converting section 6 of the example includes an air model which derives the intake air quantity from the throttle opening, and a torque map for converting the intake air quantity into torque. The torque conversion value which is obtained in the physical quantity converting section 6 is inputted in the physical quantity value selecting section 8.

The physical quantity value selecting section 8 of the example selects any one of the torque required value and the torque conversion value, and inputs it in the realizing section 10. The method for switching selection to the torque conversion value from the torque required value and switching selection to the torque required value from the torque conversion value is as described in the embodiment. Switching is executed at timing at which the torque required value and the torque conversion value correspond to each other.

In the example, the torque value selected in the physical quantity value selecting section 8 and the efficiency required value set in the required value setting section 2 are inputted in the realizing section 10. The inputted torque selection value and efficiency required value are converted into the throttle opening and the ignition time in accordance with the inverse engine model. In more detail, the inverse engine model which is used in the realizing section 10 of the example includes an air quantity map for converting torque into an intake air quantity, and an inverse air model which derives a throttle opening from the intake air quantity. The air quantity map is constituted of map data common to the aforementioned torque map. The inverse air model is an inverse model of the aforementioned air model. The throttle opening and the ignition time which are obtained by conversion by the realizing section 10 are respectively set as the final manipulation variables of the respective actuators.

Embodiment 2

Next, embodiment 2 of the present invention will be described with reference to FIG. 4.

The feature of the present embodiment is in the determination method of switch timing. The configuration of the control device is the same as that of embodiment 1, and is as shown in the functional block diagram of FIG. 1. The determination method of switch timing according to the present embodiment can be explained in accordance with FIG. 4.

In embodiment 1, the condition for executing switching is that the deviation between the physical quantity required value and the physical quantity conversion value is within the predetermined range. In contrast with this, in the present embodiment, it is added to the condition for executing switching that the deviation between the manipulation variable conversion value converted from the physical quantity required value and the manipulation variable instruction value is within the predetermined range.

Figure 4:
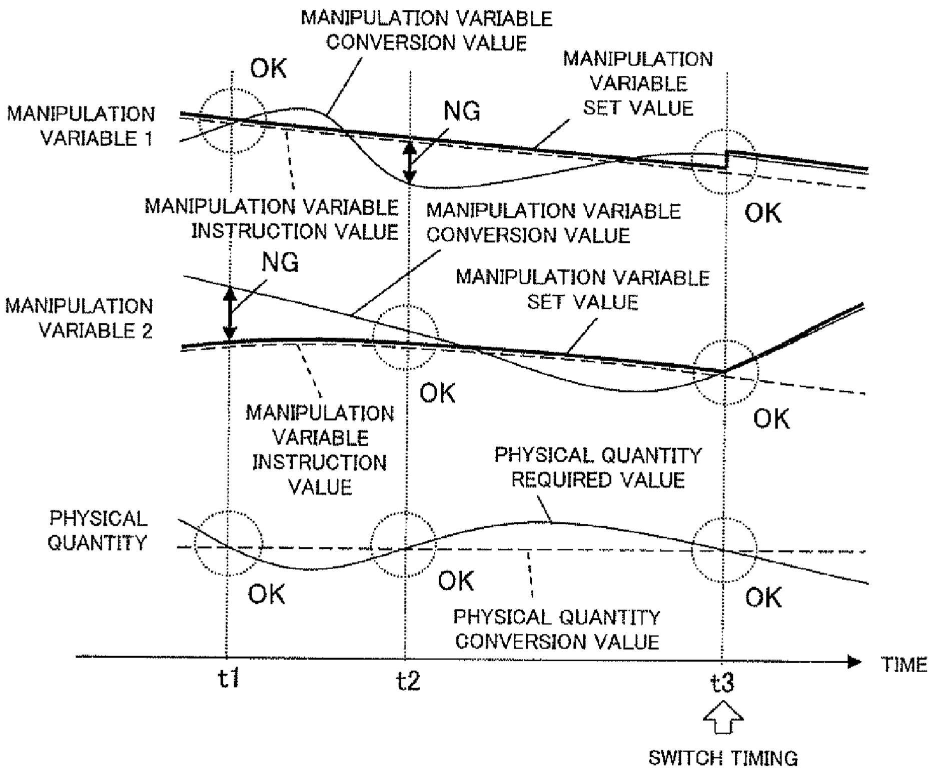
FIG. 4 is a view for explaining the determination method of switch timing according to embodiment 2 of the present invention.

In the case shown in FIG. 4, the physical quantity required value and the physical quantity conversion value correspond to each other in three time points. However, at a first time point t1, the deviation between the manipulation variable conversion value and the manipulation variable instruction value of the first actuator is within a predetermined range, but the deviation between the manipulation variable conversion value and the manipulation variable instruction value of the second actuator exceeds the predetermined range. At a next time point t2, the deviation between the manipulation variable conversion value and the manipulation variable instruction value of the second actuator is within the predetermined range, but the deviation between the manipulation variable conversion value and the manipulation variable instruction value of the first actuator exceeds the predetermined range this time. In contrast with this, further at a next time point t3, the deviations between the manipulation variable conversion values and the manipulation variable instruction values of both the first actuator and the second actuator are within the predetermined range. Accordingly, in the case shown in FIG. 4, switch of selection to the physical quantity required value from the physical quantity conversion value is performed at the time point t3.

According to the present embodiment, it is added to the switching condition that the deviation between the manipulation variable conversion value converted from the physical quantity required value and the manipulation variable instruction value is within the predetermined range, and thereby, the manipulation variable of the actuator is prevented from abruptly changing with switching. For example, in the case of the actuator with the manipulation variable being continuous like the throttle with the opening as the manipulation variable, a response delay occurs when the manipulation variable changes stepwise. In such a case, a response delay also occurs to the actual value of the physical quantity, and discontinuity is likely to occur at the time of switching. According to the present embodiment, the manipulation variable of each of the actuators can be smoothly changed, and therefore, the discontinuity which occurs to the realized value of the physical quantity can be reliably prevented.

For the actuator in which the manipulation variable discretely changes, the deviation between the manipulation variable conversion value and the manipulation variable instruction value at the time of switching may be allowed. For example, the ignition device with the ignition time as the manipulation variable, the fuel injection device with the fuel injection time as the manipulation variable and the like correspond to such actuators. Switching is unlikely to be performed forever if the time is awaited, when the deviations between the manipulation variable conversion values and the manipulation variable instruction values are within the predetermined range for all the actuators. In this respect, if the deviation at the time of switching is allowed for the actuator to which a response delay does not matter, the chance of satisfying the switching condition can be increased while discontinuity which occurs to the realized value of the physical quantity is prevented.

Embodiment 3

Subsequently, embodiment 3 of the present invention will be described with reference to FIG. 5.

Figure 5:
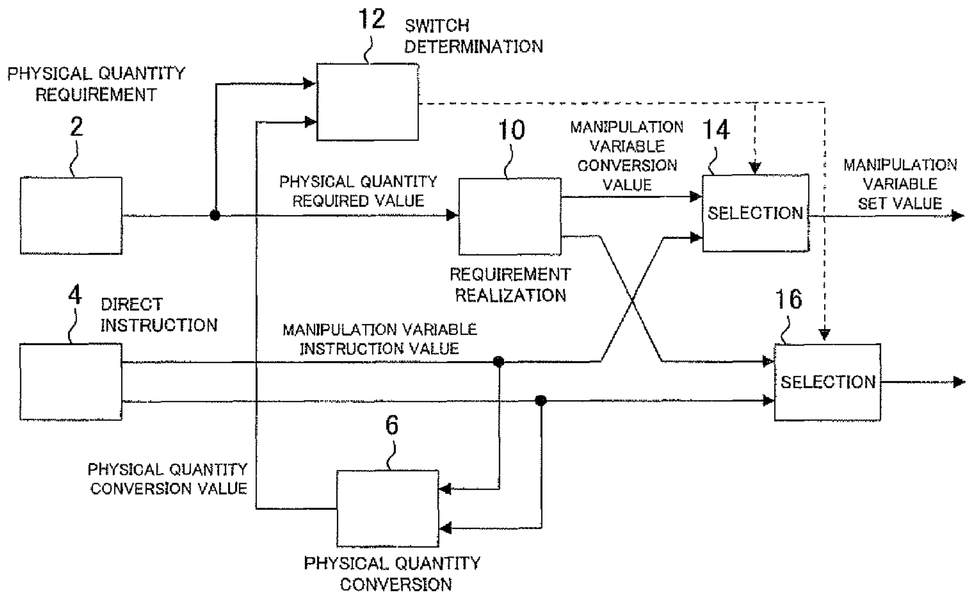
FIG. 5 is a functional block diagram of a control device for an internal combustion engine of embodiment 3 of the present invention.

FIG. 5 is a functional block diagram of a control device for an internal combustion engine of embodiment 3 of the present invention. In FIG. 5, the blocks having the functions common to embodiment 1 are assigned with the same reference numerals. Similarly to embodiment 1, at the most upstream position of the flow of the information in the control device, the required value setting section 2 and the manipulation variable instruction section 4 are disposed in parallel. Further, similarly to embodiment 1, the realizing section 10 is disposed in the control device. However, in the present embodiment, only the required value setting section 2 is connected to the realizing section 10. The manipulation variable instruction section 4 is connected to the manipulation variable value selecting sections 14 and 16 which are provided at each actuator. The realizing section 10 is also connected to the respective manipulation variable value selecting sections 14 and 16. Further, unlike embodiment 1, in the present embodiment, the physical quantity converting section 6 is disposed at a line branched from a main information transmission line. A block 12 to which the physical quantity converting section 6 is connected is a switch determining section. The switch determining section 12 is disposed at a line branched from the main information transmission line similarly to the physical quantity converting section 6 so as to receive the information from the physical quantity converting section 6 and the information from the required value setting section 2.

As shown in FIG. 5, in the present embodiment, only the physical quantity required value which is outputted from the required value setting section 2 is inputted in the realizing section 10. Accordingly, the manipulation variable conversion value converted from the physical quantity required value is always outputted from the realizing section 10. The manipulation variable conversion value which is outputted from the realizing section 10 as well as the manipulation variable instruction value which is outputted from the manipulation variable instruction section 4 is inputted in the manipulation variable value selecting sections 14 and 16 which are provided for each actuator. Each of the manipulation variable selecting sections 14 and 16 selects any one of the two inputted manipulation variable values, that is, the manipulation variable instruction value and the manipulation variable conversion value. In the present embodiment, the manipulation variable values selected in the manipulation variable value selecting sections 14 and 16 are set as the final actuator manipulation variables.

Switch of the selection in each of the manipulation variable value selecting sections 14 and 16 is performed in accordance with the switch signal which is supplied from the switch determining section 12. The switch determining section 12 corresponds to the switch determination function which the physical quantity value selecting section 8 of embodiment 1 has. The physical quantity conversion value converted from the manipulation variable instruction value in the physical quantity converting section 6, and the physical quantity required value set in the required value setting section 2 are inputted in the switch determining section 12. The switch determining section 12 compares the physical quantity conversion value and the physical quantity required value, and determines whether to permit switch on the basis of the comparison result.

As above, the control device of the present embodiment and the control device of embodiment 1 differ from each other in the respects that selection is performed at the level of a physical quantity and selection is performed at the level of a manipulation variable. However, both are common in the respect that the manipulation variable of each actuator is set based on the information of any one of the physical quantity required value set in the required value setting section 2 and the manipulation variable instruction value designated by the manipulation variable instruction section 4. Further, both are also common in the respect that determination of switch of the information for use in setting of the manipulation variable is performed at the level of the physical quantity. Furthermore, as described next, both are also common in the determination method of switch.

In the switch determining section 12, determination of switch is performed by the method common to embodiment 1. More specifically, the switch determining section 12 permits switching under the condition that the deviation between the physical quantity required value and the physical quantity conversion value is within a predetermined range. The predetermined range to be the determination reference is preferably as narrow as possible from the viewpoint of preventing occurrence of a level difference in the physical quantity. Switching may be permitted under the condition that the deviation is zero, that is, the physical quantity required value and the physical quantity conversion value correspond to each other. By adopting such a determination method of switch, switching can be achieved without generating discontinuity in the realized value of the physical quantity.

Receiving permission of switching by the switch determining section 12, each of the manipulation variable value selecting sections 14 and 16 switches the manipulation variable value which is set as the final manipulation variable to the manipulation variable conversion value from the manipulation variable instruction value, or to the manipulation variable instruction value from the manipulation variable conversion value. When the manipulation variable conversion value converted from the physical quantity required value is selected as the manipulation variable, the physical quantity required value can be realized in the actual control variable of the internal combustion engine. Meanwhile, when the manipulation variable instruction value is selected as the manipulation variable, the manipulation variable directly designated in the manipulation variable instruction section 4 is directly set as the manipulation variable set value without going through signal conversion processing such as conversion into the physical quantity or inverse conversion into the manipulation variable.

Embodiment 4

Subsequently, embodiment 4 of the present invention will be described with reference to FIG. 6.

Figure 6:
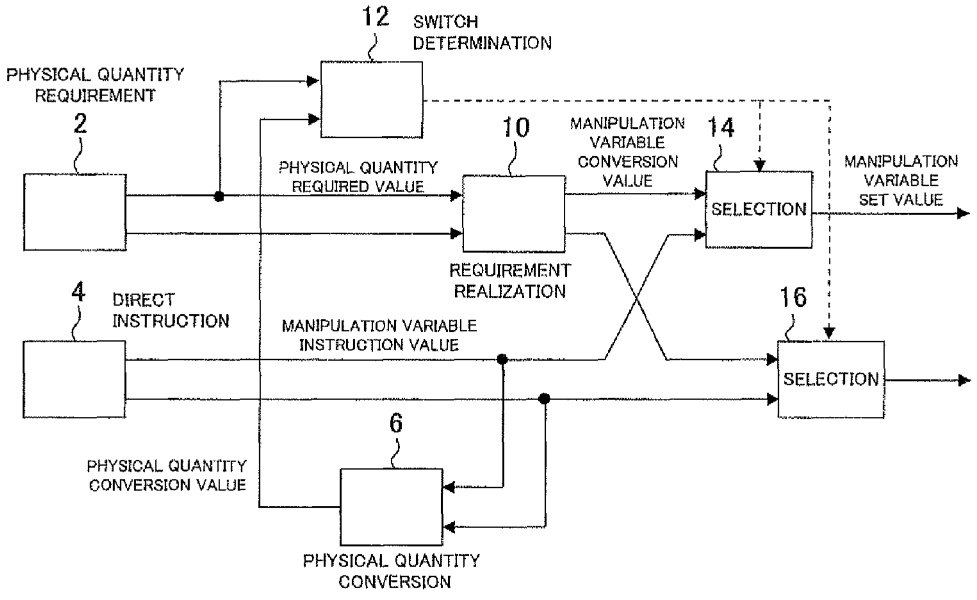
FIG. 6 is a functional block diagram of a control device for an internal combustion engine of embodiment 4 of the present invention.

FIG. 6 is a functional block diagram of a control device for an internal combustion engine of embodiment 4 of the present invention. In FIG. 6, the blocks having the functions common to those of embodiment 3 are assigned with the same reference numerals. As is understood from comparison of FIGS. 6 and 5, the control device of the present embodiment and the control device of embodiment 3 are common in the basic configuration. The difference between both of them is in the number of physical quantity required values outputted from the required value setting section 2. In the present embodiment, a plurality of different (two in FIG. 6) physical quantity required values are supplied to the realizing section 10 from the required value setting section 2.

The realizing section 10 converts these plurality of physical quantity required values into the manipulation variables of the respective actuators. Meanwhile, in the physical quantity converting section 6, what is obtained by converting the manipulation variable instruction value of each of the actuators is one physical quantity value. The single physical quantity conversion value which is obtained in the physical quantity converting section 6 corresponds to one of a plurality of physical quantity required values set in the required value setting section 2. The one is the physical quantity the continuity of which is considered to be the most important. In the switch determining section 12, the physical quantity required value and the physical quantity conversion value relating to the physical quantity the continuity of which is considered to be the most important are compared. When the deviation of both of them is within a predetermined range, switch of selection by the respective manipulation variable value selecting sections 14 and 16 is permitted.

According to the present embodiment, switch to the manipulation variable conversion value from the manipulation variable instruction value, or to the manipulation variable instruction value from the manipulation variable conversion value can be achieved without generating discontinuity in the realized value of the physical quantity the continuity of which is considered to be the most important. Further, when a plurality of physical quantity required values are present, the time required for switching can be prevented from being long.

Embodiment 5

Finally, embodiment 5 of the present invention will be described with reference to FIG. 7.

The feature of the present embodiment is in the determination method of switch timing. The configuration of a control device is basically the same as that of embodiment 4. However, though not illustrated, the physical quantity converting section 6 of the present embodiment outputs the same number of kinds of physical quantity conversion values as the physical quantity required values outputted from the required value setting section 2. More specifically, if two kinds of physical quantity required values are present, two kinds of physical quantity conversion values are obtained by conversion of the manipulation variable instruction value. In the switch determining section 12 of the present embodiment, the physical quantity required values and the physical quantity conversion values are compared with respect to all the plurality of physical quantities. When the deviations between the physical quantity required values and the physical quantity conversion values are within the predetermined range with respect to all the plurality of physical quantities, switch of selection by each of the manipulation variable value selecting sections 14 and 16 is permitted.

Figure 7:
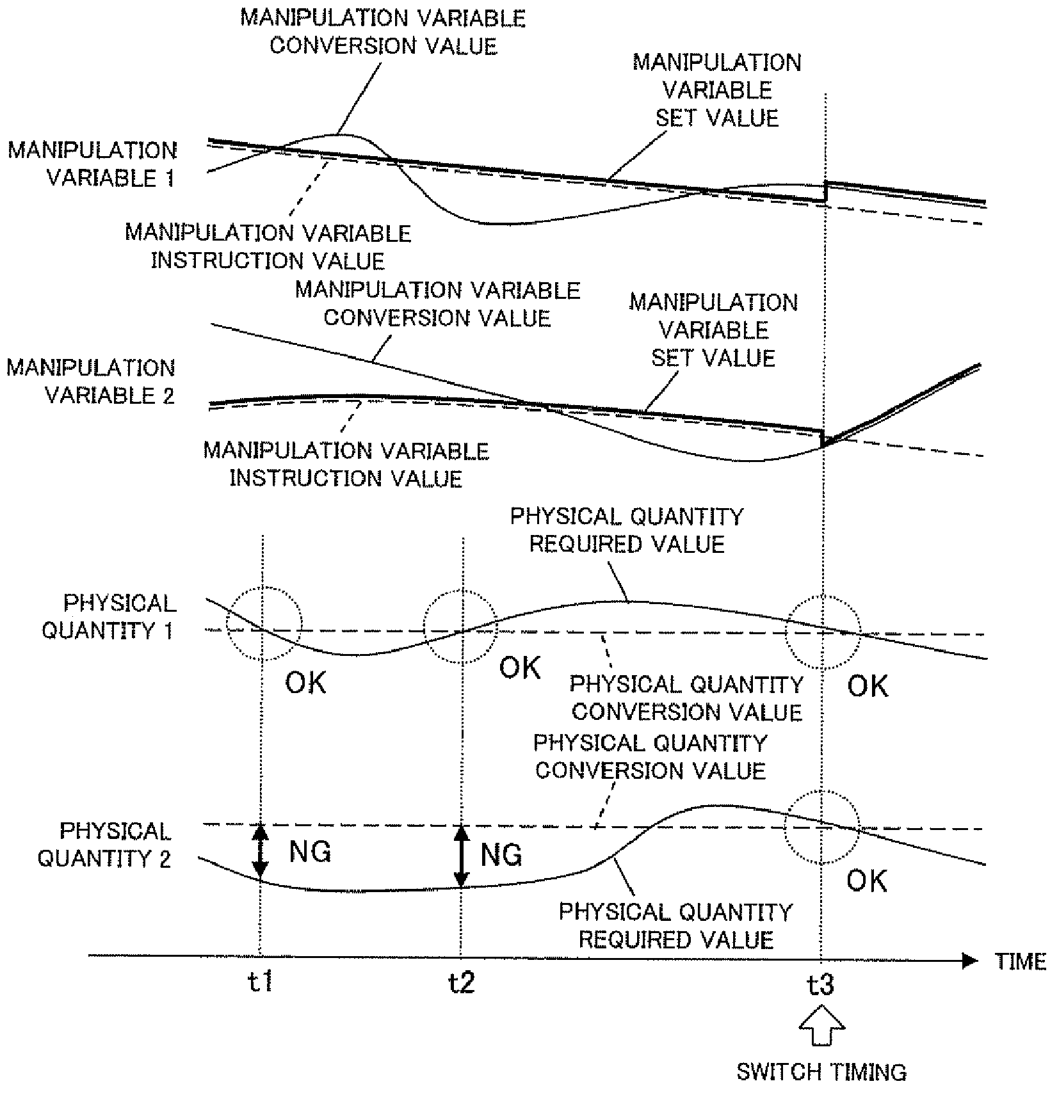
FIG. 7 is a view for explaining the determination method of switch timing according to embodiment 5 of the present invention.

A determination method of switch timing according to the present embodiment can be described in accordance with FIG. 7. In FIG. 7, the case of presence of two kinds of a physical quantity 1 and a physical quantity 2 as the control variables of the internal combustion engine is cited as an example. In the case shown in FIG. 7, the physical quantity required value and the physical quantity conversion value in the physical quantity 1 correspond to each other at three time points. However, at the first and the next time points t1 and t2, the deviations between the physical quantity required values and the physical quantity conversion values in the physical quantity 2 exceed the predetermined range. In contrast with this, further at the next time point t3, the deviations between the physical quantity required values and the physical quantity conversion values of both of the physical quantity 1 and the physical quantity 2 are within a predetermined range. Accordingly, in the case shown in FIG. 7, switch of selection by each of the manipulation variable value selecting sections 14 and 16 is permitted at the time point t3. According to the present embodiment, switch to the manipulation variable conversion value from the manipulation variable instruction value, or to the manipulation variable instruction value from the manipulation variable conversion value can be achieved without generating discontinuity in the realized values of all the physical quantities which are required.

OTHERS

The embodiments of the present invention are described above, but the present invention is not limited to the aforementioned embodiments. The present invention can be carried out by being variously modified from the aforementioned embodiments within the range without departing from the gist thereof. For example, the aforementioned embodiments may be carried out by being modified as follows.

The determination method of switch described in embodiment 2 can be applied to any of embodiments 3 to 5. Under the additional condition that the switch determination function is attached to each of the manipulation variable value selecting sections 14 and 16 and the deviation between the manipulation variable conversion value and the manipulation variable instruction value is within a predetermined range, switching may be executed.

Further, the determination method of switch in the case of presence of physical quantity required values with respect to a plurality of different physical quantities, which is described in embodiment 4 and embodiment 5, also can be applied to embodiment 1 and embodiment 2.

A correction function in the case of the physical quantity required value exceeding the realizable range by the internal combustion engine may be added to the realizing section 10 of each of the embodiments. More specifically, in the process of conversion of the physical quantity required value into a manipulation variable via one or a plurality of parameters, an upper limit or a lower limit is set to a certain parameter, and if the parameter value exceeds the upper limit value or the lower limit value, the parameter value may be restrained to the upper limit value or the lower limit value. The upper limit value and the lower limit value in such a case are determined from the physically realizable range in the internal combustion engine. If such a correction function is attached to the realizing section 10, a failure can be prevented from occurring to the operation of the internal combustion engine by manipulation of the actuator exceeding the realizable range of the internal combustion engine. Especially in embodiments 1 and 2, the correction function of the realizing section 10 works on not only the physical quantity required value but also the physical quantity conversion value converted from the manipulation variable instruction value. Therefore, even if the manipulation variable instruction value is the value exceeding the realizable range of the internal combustion engine, the final manipulation variable set value is automatically within the realizable range of the internal combustion engine.

DESCRIPTION OF REFERENCE NUMERALS

2 Required value setting section
4 Manipulation variable instruction section
6 Physical quantity converting section
8 Physical quantity value selecting section
10 Realizing section
12 Switch determining section
14, 16 Manipulation variable value selecting section

The invention claimed is:

1. A control device for an internal combustion engine which uses a specific physical quantity as a control variable of the internal combustion engine, and controls the internal combustion engine by manipulation of one or a plurality of actuators, comprising:

required value setting means which sets a required value of the physical quantity;

manipulation variable instruction means which designates a manipulation variable of at least one actuator of the one or the plurality of actuators;

manipulation variable setting means which sets a manipulation variable or manipulation variables of the one or the plurality of actuators based on information of any one of a physical quantity required value set by the required value setting means and a manipulation variable instruction value designated by the manipulation variable instruction means;

manipulating means which manipulates the one or the plurality of actuators in accordance with a manipulation variable set value which is set by the manipulation variable setting means;

physical quantity converting means which converts the manipulation variable instruction value into a value of the physical quantity which is realized in the internal combustion engine by the manipulation variable instruction value; and switch determining means which permits switch of the information for use in setting of the manipulation variable in the manipulation variable setting means when a deviation between the physical quantity required value and a physical quantity conversion value obtained by conversion by the physical quantity converting means is within a predetermined range.

2. The control device for an internal combustion engine according to claim 1, wherein the manipulation variable setting means comprises physical quantity value selecting means which selects any one of the physical quantity required value and the physical quantity conversion value, and manipulation variable converting means which converts a physical quantity selection value which is selected by the physical quantity value selecting means into a manipulation variable or manipulation variables of the one or the plurality of actuators for realizing the physical quantity selection value in the internal combustion engine, the manipulation variable setting means sets the manipulation variable conversion value converted by the manipulation variable converting means as a manipulation variable set value, and the switch determining means permits switch of selection by the physical quantity value selecting means when the deviation between the physical quantity required value and the physical quantity conversion value is within a predetermined range.

3. The control device for an internal combustion engine according to claim 2, wherein the switch determining means permits switch of selection by the physical quantity value selecting means when the deviation between the physical quantity required value and the physical quantity conversion value is within a predetermined range, and the deviation between the manipulation variable conversion value and the manipulation variable instruction value is within a predetermined range.

4. The control device for an internal combustion engine according to claim 2, further comprising:

a conversion map in which a parameter value which is correlated with the physical quantity, and a parameter value which is correlated with a manipulation variable of at least one actuator of the one or the plurality of actuators are associated with each other, wherein the manipulation variable converting means and the physical quantity converting means both perform conversion processing with reference to the conversion map.

5. The control device for an internal combustion engine according to claim 2, wherein the physical quantity converting means converts the manipulation variable instruction value into the physical quantity conversion value by using an engine model which is a result of modeling a control characteristic of the internal combustion engine by the one or the plurality of actuators, and the manipulation variable converting means converts the physical quantity selection value into the manipulation variable conversion value by using an inverse model of the engine model.

6. The control device for an internal combustion engine according to claim 1, wherein the manipulation variable setting means comprises manipulation variable converting means which converts the physical quantity required value into a manipulation variable or variables of the one or the plurality of actuators for realizing the physical quantity required value in the internal combustion engine, and manipulation variable value selecting means which selects any one of a manipulation variable conversion value obtained by conversion by the manipulation variable converting means and the manipulation variable instruction value for each actuator, the manipulation variable setting means sets a manipulation variable selection value which is selected by the manipulation variable value selecting means as a manipulation variable set value, and the switch determining means permits switch of selection by the manipulation variable value selecting means when the deviation between the physical quantity required value and the physical quantity conversion value is within a predetermined range.

7. The control device for an internal combustion engine according to claim 6, wherein the switch determining means permits switch of selection by the manipulation variable value selecting means when the deviation between the physical quantity required value and the physical quantity conversion value is within a predetermined range, and the deviation between the manipulation variable conversion value and the manipulation variable instruction value is within a predetermined range.

8. The control device for an internal combustion engine according to claim 6, further comprising:

a conversion map in which a parameter value which is correlated with the physical quantity, and a parameter value which is correlated with a manipulation variable of at least one actuator of the one or the plurality of actuators are associated with each other, wherein the manipulation variable converting means and the physical quantity converting means both perform conversion processing with reference to the conversion map.

9. The control device for an internal combustion engine according to claim 6, wherein the physical quantity converting means converts the manipulation variable instruction value into the physical quantity conversion value by using an engine model which is a result of modeling a control characteristic of the internal combustion engine by the one or the plurality of actuators, and the manipulation variable converting means converts the physical quantity required value into the manipulation variable conversion value by using an inverse model of the engine model.

10. The control device for an internal combustion engine according to claim 1, wherein the required value setting means sets physical quantity required values with respect to a plurality of different physical quantities, the physical quantity converting means converts the manipulation variable instruction value into a value of at least a physical quantity in which continuity is considered to be the most important out of the plurality of physical quantities, and the switch determining means permits switch of information for use in setting of a manipulation variable in the manipulation variable setting means when a deviation between a physical quantity required value and a physical quantity conversion value with respect to the physical quantity in which continuity is considered to be the most important is within a predetermined range.

11. The control device for an internal combustion engine according to claim 1, wherein the required value setting means sets physical quantity required values with respect to a plurality of different physical quantities, the physical quantity converting means converts the manipulation variable instruction value into respective values of the plurality of physical quantities, and the switch determining means permits switch of information for use in setting of a manipulation variable in the manipulation variable setting means when deviations between physical quantity required values and physical quantity conversion values are within a predetermined range with respect to all the plurality of physical quantities.

12. A control device for an internal combustion engine which uses a specific physical quantity as a control variable of the internal combustion engine, and controls the internal combustion engine by manipulation of one or a plurality of actuators, comprising:

a required value setting unit which sets a required value of the physical quantity;

a manipulation variable instruction unit which designates a manipulation variable of at least one actuator of the one or the plurality of actuators;

a manipulation variable setting unit which sets a manipulation variable or manipulation variables of the one or the plurality of actuators based on information of any one of a physical quantity required value set by the required value setting unit and a manipulation variable instruction value designated by the manipulation variable instruction unit;

a manipulating unit which manipulates the one or the plurality of actuators in accordance with a manipulation variable set value which is set by the manipulation variable setting unit;

a physical quantity converting unit which converts the manipulation variable instruction value into a value of the physical quantity which is realized in the internal combustion engine by the manipulation variable instruction value; and a switch determining unit which permits switch of the information for use in setting of the manipulation variable in the manipulation variable setting unit when a deviation between the physical quantity required value and a physical quantity conversion value obtained by conversion by the physical quantity converting unit is within a predetermined range.

* * * * *